US012783191B2

(12) United States Patent
Hori

(10) Patent No.: US 12,783,191 B2
(45) Date of Patent: Nov. 3, 2026

(54) INFORMATION PROCESSING APPARATUS THAT ENABLES USER TO DESIGNATE PRINT QUEUE, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Daisuke Hori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 18/797,660

(22) Filed: Aug. 8, 2024

(65) Prior Publication Data

US 2025/0068368 A1 Feb. 27, 2025

(30) Foreign Application Priority Data

Aug. 23, 2023 (JP) ................................ 2023-135338

(51) Int. Cl.
*G06F 3/12* (2006.01)

(52) U.S. Cl.
CPC ............ *G06F 3/126* (2013.01); *G06F 3/1203* (2013.01); *G06F 3/1226* (2013.01); *G06F 3/1284* (2013.01)

(58) Field of Classification Search
None
See application file for complete search history.

(56) References Cited

U.S. PATENT DOCUMENTS

| | | | | |
|---|---|---|---|---|
| 11,429,320 | B2 | 8/2022 | Hosomizo | |
| 11,768,638 | B2 | 9/2023 | Hosomizo | |
| 2021/0165612 | A1* | 6/2021 | Takahashi | G06F 3/1224 |
| 2021/0200488 | A1* | 7/2021 | Inoue | G06F 3/1243 |

FOREIGN PATENT DOCUMENTS

| | | | |
|---|---|---|---|
| JP | 2020-126364 | A | 8/2020 |

* cited by examiner

*Primary Examiner* — Andrew H Lam
(74) *Attorney, Agent, or Firm* — VENABLE LLP

(57) ABSTRACT

An information processing apparatus includes an operating system in which print data generation software is embedded and a print application to use, as a printing destination, a printing apparatus associated with a print queue of a specific printer driver supplied from a specific vendor. Capabilities information of a printing apparatus associated with the print data generation software is acquired. Whether the print application supports a printing apparatus associated with the print data generation software is determined based on the capabilities information. A print queue of the specific printer driver is added to a list of print queues for prompting a user to select a print queue to be used for printing. If it is determined that the print application supports the printing apparatus associated with the print data generation software, a print queue of the print data generation software is added to the list.

12 Claims, 10 Drawing Sheets

*FIG. 5A*

| SUPPORT APP | VERSION |
|---|---|
| PRINT APPLICATION A | 1.0 OR HIGHER |
| PRINT APPLICATION B | 3.0 OR HIGHER |
| MAINTENANCE APPLICATION C | 1.0 OR HIGHER |

*FIG. 5B*

| ID | VALUE |
|---|---|
| SupportApp | IJ_Soft01 |

FIG. 6

601

```
<?xml version="1.0" encoding="utf-8"?>
<PrintDeviceCapabilities...>
        ...
    <psk:PageMediaType psf2:psftype="Feature">
      <psk:Plain psf2:psftype="Option" psf2:default=" true" />
      <psk:Photographic psf2:psftype="Option" psf2:default="false" />
    </psk:PageMediaType>
    <psk:PageOrientation psf2:psftype="Feature">
      <psk:Portrait psf2:psftype="Option" psf2:default="true" />
      <psk:Landscape psf2:psftype="Option" psf2:default="false" />
    </psk:PageOrientation>
    ...
</PrintDeviceCapabilities>
```

*FIG. 7*

701

```
<?xml version="1.0" encoding="utf-8"?>
<PrintDeviceCapabilities...
   xmlns:nsOriginal="htttp://www.AAA.com/printschema1">   702
      ...
      <psk:PageMediaType psf2:psftype="Feature">
         <psk:Plain psf2:psftype="Option" psf2:default=" true" />
         <psk:Photographic psf2:psftype="Option" psf2:default="false" />
         <nsOriginal:AAA_Special psf2:psftype="Option" psf2:default="false" />   703
      </psk:PageMediaType>
      <psk:PageOrientation psf2:psftype="Feature">
         <psk:Portrait psf2:psftype="Option" psf2:default="true" />
         <psk:Landscape psf2:psftype="Option" psf2:default="false" />
      </psk:PageOrientation>
         ...
      <nsOriginal:RollWidth psf2:psftype="Feature">   704
         <nsOriginal:300mm psf2:psftype="Option" psf2:default="false" />
         <nsOriginal:600mm psf2:psftype="Option" psf2:default="true" />
      </nsOriginal:RollWidth>
         ...
</PrintDeviceCapabilities>
```

FIG. 8

801

```
<?xml version="1.0" encoding="utf-8"?>
<PrintDeviceCapabilities...
  xmlns:nsOriginal="htttp://www.AAA.com/printschema1">
      ...
    <psk:PageMediaType psf2:psftype="Feature">
      <psk:Plain psf2:psftype="Option" psf2:default=" true" />
      <psk:Photographic psf2:psftype="Option" psf2:default="false" />
      <nsOriginal:AAA_Special psf2:psftype="Option" psf2:default="false" />
    </psk:PageMediaType>
    <psk:PageOrientation psf2:psftype="Feature">
      <psk:Portrait psf2:psftype="Option" psf2:default="true" />
      <psk:Landscape psf2:psftype="Option" psf2:default="false" />
    </psk:PageOrientation>
      ...
    <nsOriginal:RollWidth psf2:psftype="Feature">
      <nsOriginal:300mm psf2:psftype="Option" psf2:default="false" />
      <nsOriginal:600mm psf2:psftype="Option" psf2:default="true" />
    </nsOriginal:RollWidth>
      ...
    <nsOriginal:SupportApp psf2:psftype="Property" xsi:type="xsd:string">IJ_Soft01</nsOriginal:SupportApp>
      ...
</PrintDeviceCapabilities>
```

802

*FIG. 10*

1001

```
<psf:PrintCapabilities ...
   xmlns:nsOriginal="htttp://www.AAA.com/printschema1">

<psf:Feature name="psk:PageMediaType">
  <psf:Option name="psk:Plain" constrained="psk:None"/>
  <psf:Option name="psk:PhotoPaper" constrained="psk:None"/>
  <psf:Option name="nsOriginal:AAA_Special" constrained="psk:None"/>
</psf:Feature>
<psf:Feature name="psk:PageOrientation">
  <psf:Option name="psk:Portlait" constrained="psk:None"/>
  <psf:Option name="psk:Landscape" constrained="psk:None"/>
</psf:Feature>
<psf:Feature name="nsOriginal:RollWidth">
  <psf:Option name="nsOriginal:300mm" constrained="psk:None"/>
  <psf:Option name="nsOriginal:600mm" constrained="psk:None"/>
</psf:Feature>
<psf:Property name="nsOriginal:SupportApp">
  <psf:Value xsi:type="xsd:string">IJ_Soft01</psf:Value>
</psf:Property>
 ...
</psf:PrintCapabilities>
```

1002

INFORMATION PROCESSING APPARATUS THAT ENABLES USER TO DESIGNATE PRINT QUEUE, METHOD OF CONTROLLING INFORMATION PROCESSING APPARATUS, AND STORAGE MEDIUM

BACKGROUND OF THE INVENTION

Field of the Invention

The present invention relates to an information processing apparatus that enables a user to designate a print queue, a method of controlling the information processing apparatus, and a storage medium.

Description of the Related Art

As software for controlling a printing apparatus, there is known a configuration that uses a printer driver installed in a host computer to provide a print instruction to a printing apparatus connected to the host computer. In the host computer, an operating system (OS) as the basic software is installed, and the printer driver is configured according to the specification defined by the OS and operates when called by the OS. A vendor (or a manufacturer) that provides a printing apparatus can provide, by providing a printer driver compatible with the specification of the OS, means for instructing the printing apparatus to perform printing by using the OS.

In recent years, in Windows (registered trademark), print data generation software (hereinafter referred to as the standard driver) which can be applied to a variety of printing apparatuses provided by different vendors is provided (see e.g. Japanese Laid-Open Patent Publication (Kokai) No. 2020-126364). This standard driver is embedded in the OS in advance, and by connecting a desired printing apparatus to the host computer, this easily enables the printing apparatus to be used. Therefore, it is unnecessary to separately install a printer driver which is unique to a model of a printing apparatus and suitable to the printing apparatus, which is very convenient to a user. Further, the standard driver is configured such that a print function can be designated based on print function information generated from information acquired from the connected printing apparatus. This enables a user using the standard driver to designate a print function supported by the standard driver out of a plurality of print functions equipped in the connected printing apparatus.

Incidentally, there is known a configuration that controls the display of a print setting screen for prompting a user to designate a print queue used for printing, by using a print application installed in a host computer. The print applications of this type include a print application which uses, out of print queues registered in the host computer, only print queues of a specific printer driver provided by a specific vendor, as print targets. In a case where the print application is used, the user designates a print queue to be used for printing, out of print queues of the specific printer driver, which are displayed on the print setting screen. That is, even if a printing apparatus provided by a specific vendor and supported by the print application is associated with the standard driver, the user cannot designate a print queue of the standard driver as a print queue to be used for printing.

SUMMARY OF THE INVENTION

The present invention provides an information processing apparatus that enables a user to designate a print queue of a standard driver associated with a printing apparatus supported by a print application, a method of controlling the information processing apparatus, and a storage medium.

In a first aspect of the present invention, there is provided an information processing apparatus comprising an operating system in which print data generation software is embedded in advance, a print application configured to use, as a printing destination, a printing apparatus associated with a print queue of a specific printer driver supplied from a specific vendor (manufacturer), at least one processor, and a memory coupled to the at least one processor storing instructions that, when executed by the processor, cause the processor to function as an acquisition unit configured to acquire capabilities information of a printing apparatus associated with the print data generation software, a determination unit configured to determine whether or not the print application supports a printing apparatus associated with the print data generation software, based on the capabilities information, and an addition unit configured to add a print queue of the specific printer driver to a list of print queues for prompting a user to select a print queue to be used for printing, wherein in a case where it is determined that the print application supports the printing apparatus associated with the print data generation software, the addition unit adds a print queue of the print data generation software to the list.

In a second aspect of the present invention, there is provided an information processing apparatus comprising an operating system in which print data generation software is embedded in advance, an application configured to support a function of the print data generation software, a print application configured to use, as a printing destination, a printing apparatus associated with a print queue of a specific printer driver supplied from a specific vendor, at least one processor, and a memory coupled to the at least one processor storing instructions that, when executed by the processor, cause the processor to function as a determination information addition unit configured to add determination information for determining whether or not a print queue of the print data generation software can be caused to be included in print targets, to print function information generated by the print data generation software or the operating system, a determination unit configured to determine whether or not the print application supports a printing apparatus associated with the print data generation software, based on capabilities information generated based on the print function information including the determination information, and a print queue addition unit configured to add a print queue of the specific printer driver to a list of print queues for prompting a user to select a print queue to be used for printing, wherein in a case where it is determined that the print application supports the printing apparatus associated with the print data generation software, the print queue addition unit adds a print queue of the print data generation software to the list.

According to the present invention, a user is enabled to designate a print queue of a standard driver associated with a printing apparatus supported by a print application.

Further features of the present invention will become apparent from the following description of exemplary embodiments (with reference to the attached drawings).

BRIEF DESCRIPTION OF THE DRAWINGS

FIGS. 5A and 5B are diagrams each showing an example of additional information acquired in a step S402 in FIG. 4.

FIG. 6 is a diagram showing an example of PDC before being edited in a step S403 in FIG. 4.

FIG. 7 is a diagram showing an example of the PDC edited in the step S403 in FIG. 4.

FIG. 8 is a diagram showing an example of the PDC edited in a step S405 in FIG. 4.

FIG. 10 is a diagram showing an example of PC generated based on the PDC shown in FIG. 8.

DESCRIPTION OF THE EMBODIMENTS

Figure 1:
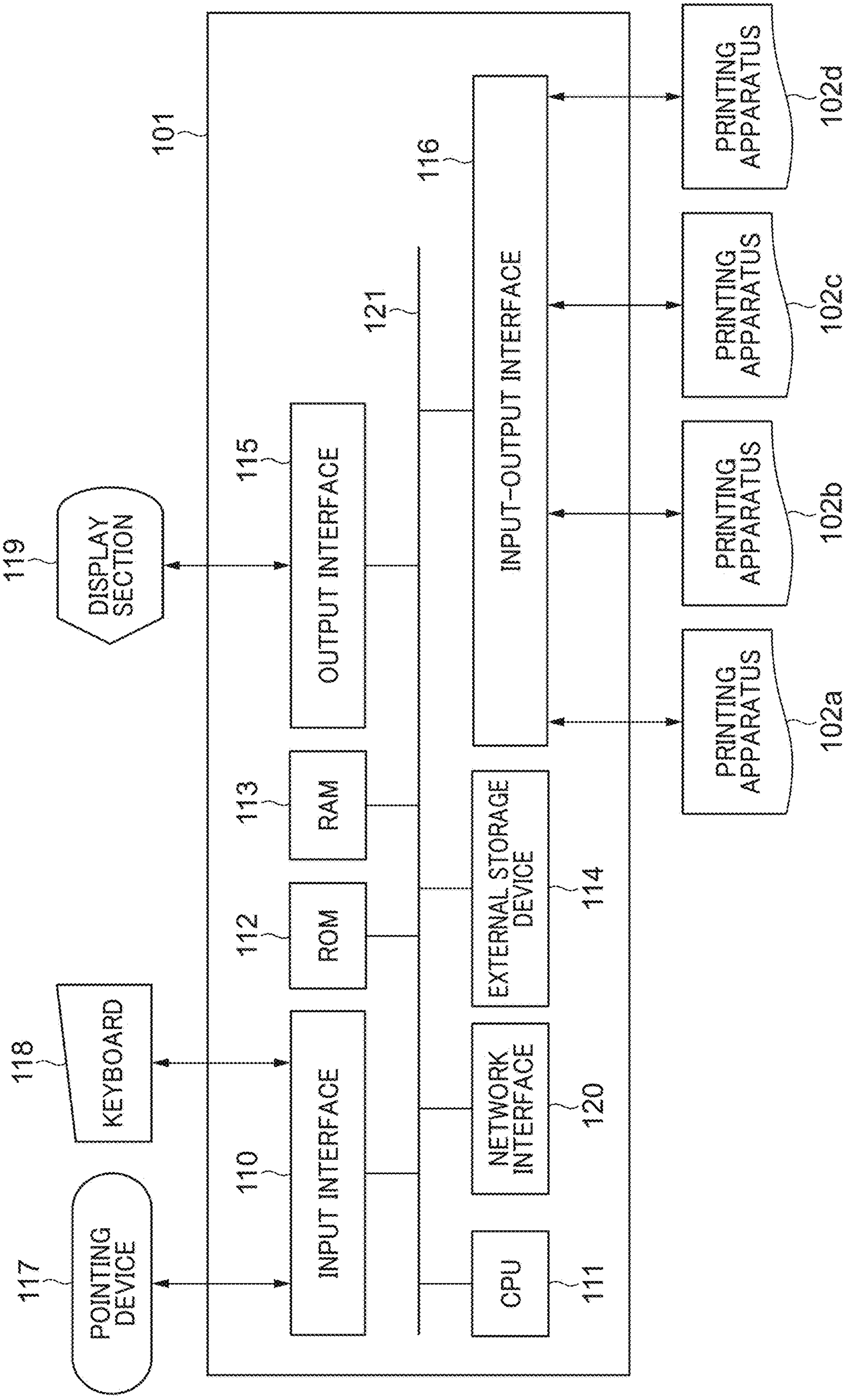
FIG. 1 is a block diagram schematically showing a hardware configuration of a host computer as an information processing apparatus according to an embodiment of the present invention.

The present invention will now be described in detail below with reference to the accompanying drawings showing embodiments thereof. Note that the present invention is not limited to the embodiments described below, and not all combinations of features described in the embodiments are absolutely essential to the solution of the invention. Note that the same component elements are denoted by the same reference numerals, and description thereof is omitted.

FIG. 1 is a block diagram schematically showing a hardware configuration of a host computer 101 as an information processing apparatus according to the present embodiment. Referring to FIG. 1, the host computer 101 includes an input interface 110, a central processing unit (CPU) 111, a read only memory (ROM) 112, a random access memory (RAM) 113, an external storage device 114, an output interface 115, an input-output interface 116, and a network interface 120. These are interconnected via a bus 121.

The CPU 111 controls the overall operation of the host computer 101. The ROM 112 stores an initialization program and so forth. The RAM 113 is used e.g. as a work memory when the CPU 111 executes a program stored in the ROM 112 or the external storage device 114. The external storage device 114 stores programs for operating software, described hereinafter with reference to FIG. 2, and so forth. Note that in the present embodiment, functions, described hereinafter, of the host computer 101, and processes, described hereinafter with reference to drawings, are executed by the CPU 111 that executes the programs stored in the ROM 112 or the external storage device 114.

To the input interface 110, input devices, such as a pointing device 117 and a keyboard 118, are connected. To the output interface 115, a display device, such as a display section 119, is connected. The network interface 120 performs control to transfer data to and from an external apparatus via a network.

One or more printing apparatuses are connected to the host computer 101 via the input-output interface 116. Note that in the present embodiment, four printing apparatuses 102*a* to 102*d* are connected to the host computer 101 by way of example. All of the printing apparatuses 102*a* to 102*d* are printing apparatuses of a model of an "AAA Inkjet" series provided by the same vendor, which are inkjet printing apparatuses configured to perform printing by ejecting ink on a sheet surface. Note that the printing apparatuses 102*a* to 102*d* can be configured to perform printing by using another method, such as the electrophotographic method. Note that in the present embodiment, let it be assumed that printer drivers 203 to 205, described hereinafter with reference to FIG. 2, which are associated with the printing apparatuses 102*a* to 102*c*, respectively, out of the printing apparatuses 102*a* to 102*d* have been installed in the host computer 101. Further, as for the printing apparatus 102*d*, a printer driver unique to a model, associated with the printing apparatus 102*d*, has not been installed, and the printing apparatus 102*d* is associated with print data generation software 202, described hereinafter with reference to FIG. 2.

Note that in the present embodiment, as the host computer 101, a desktop-type personal computer is assumed. Therefore, FIG. 1 shows a configuration in which the display section 119, and the pointing device 117 and the keyboard 118, which form an operation section, are not included in the host computer 101. However, the host computer 101 is not limited to the desktop-type personal computer but can be a smartphone, a tablet terminal, a laptop-type personal computer, or a like other communication apparatus. In a case where the host computer 101 is any of these communication apparatuses, the display section 119 and the operation section are included in the host computer 101.

Note that the method of connecting the printing apparatus to the host computer 101 is not limited to connection via the input-output interface 116, but for example, the printing apparatus can be connected by wireless communication via the network interface 120.

Figure 2:
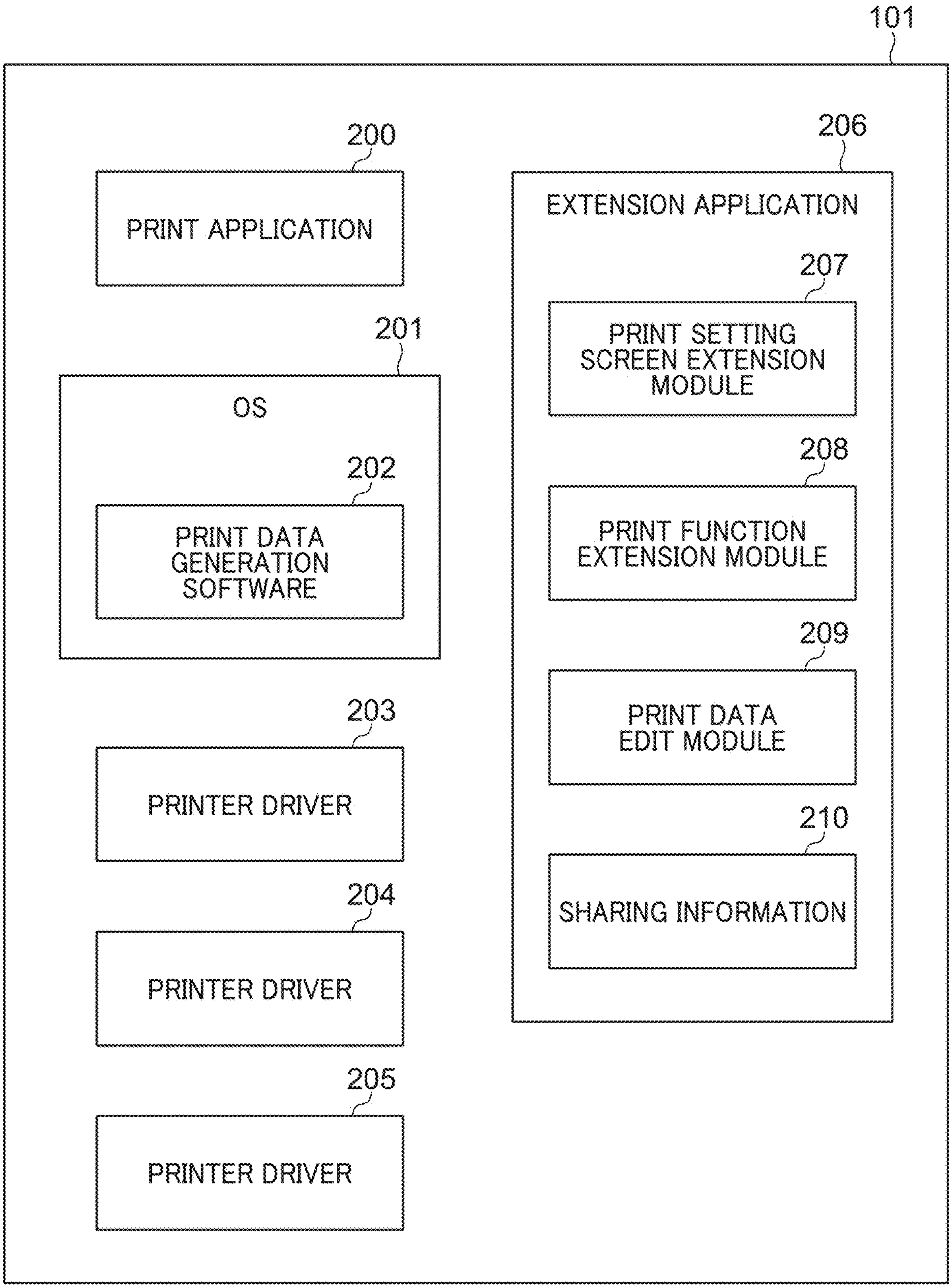
FIG. 2 is a block diagram schematically showing a software configuration of the host computer shown in FIG. 1.

FIG. 2 is a block diagram schematically showing a software configuration of the host computer 101 shown in FIG. 1. Referring to FIG. 2, the host computer 101 includes a print application 200, an OS 201, the printer drivers 203 to 205, and an extension application 206, as software. In the OS 201, the print data generation software 202, which is a standard driver capable of being applied to a variety of printing apparatuses provided by different vendors, is embedded in advance. Processing operations of the software are realized by the CPU 111 that executes the programs stored e.g. in the external storage device 114.

The print application 200 is software for generating contents to be printed (drawing data) and is e.g. a document generation application or a spreadsheet application. The print application 200 controls the display of a print setting screen for prompting a user to make print settings. The print setting screen includes setting items indicating print functions which can be set according to capabilities information (information which can be set as the print settings) acquired e.g. from the print data generation software 202, and settings information of the setting items. The capabilities information is also referred to as the print capabilities and this capabilities information is hereinafter referred to as the "PC". Further, the print application 200 issues a print instruction to the OS 201 upon receipt of a print request from a user. The print instruction includes print setting information for instructing the operation of the printing apparatus. The print setting information is also referred to as the print ticket. Note that the print application 200 is an application using a printing apparatus, as a printing destination, which is associated with a print queue of a specific printer driver provided by a specific vendor. Note that the printing apparatus associated with the print queue is also simply expressed as the print queue.

The OS 201 is, for example, Windows 11 (registered trademark) of Microsoft (registered trademark). The OS 201 generates intermediate data based on a print instruction issued by the print application 200 and transfers the generated intermediate data to the print data generation software 202 and one, designated by the user, of the printer drivers 203 to 205. Note that the data issued by the print application 200 as the print instruction is data of the Graphic Device Interface (GDI) format or data of the XML Paper Specification (XPS) format.

For example, in a case where the data issued by the print application 200 is GDI data, the OS 201 converts the GDI data to XPS data. The OS 201 transfers the XPS data to the driver designated by the user as the intermediate data. Further, if the data issued by the print application 200 is XPS data, the OS 201 transfers the XPS data, as the intermediate data, to the driver designated by the user. Note that the intermediate data includes drawing data as information on a picture (image) to be formed on a sheet surface and the print setting information set by the user.

The print data generation software 202 is e.g. the IPP Class Driver. The IPP Class Driver is a printer driver that executes print processing according to specification of a standard print protocol referred to as the Internet Printing Protocol (IPP). The print data generation software 202 is not a printer driver unique to a model of the printing apparatus but a standard driver which can be applied to a variety of printing apparatuses regardless of a maker and a model. Note that the print data generation software 202 is equipped only with the standard print functions. Therefore, differently from the printer drivers 203 to 205 each of which is unique to a model, out of a plurality of print functions equipped in the printing apparatus, only the print functions supported by the print data generation software 202 are available.

Further, the print data generation software 202 determines the PC based on the print function information. The print function information is data indicating all print functions which can be set and settings of the print functions, and print functions on which an exclusive relation between the settings is described. The print function information is the print device capabilities, and in the following description, the print function information is referred to as the "PDC". The PDC is included in a configuration file of the print data generation software 202 and stored in the external storage device 114 as a file which cannot be changed without permission of the OS 201. The PDC is dynamically generated by the print data generation software 202 or the OS 201. For example, the print data generation software 202 acquires attribute data from the printing apparatus 102*d*, which is the printing apparatus associated with the print data generation software 202, and generates the PDC based on attribute information included in the attribute data. Note that the attribute data is response information which can be acquired by issuing an IPP Get-Printer-Attributes operation to the printing apparatus 102*d* associated with the print data generation software 202. The attribute information indicating the functions which can be designated in the printing apparatus 102*d* (capabilities of the printing apparatus) and settings concerning the attribute information are included in this response information, and the response information is stored in the RAM 113.

By thus performing the control, the print data generation software 202 is capable of prompting a user to designate, even for a printing apparatus provided by any vendor, a print function which is equipped in the printing apparatus and supported by the print data generation software 202.

Note that the configuration using the IPP Class Driver as the print data generation software 202 will be described, but this is not limitative. For example, as the print data generation software 202, the UP Class Driver installed in Windows 11 (registered trademark) can also be used. The UP Class Driver is a printer driver used by Universal Print as one form of cloud printing which performs printing via a server (not shown).

The printer driver 203 is a printer driver unique to a model of the printing apparatus 102*a*. The printer driver 204 is a printer driver unique to a model of the printing apparatus 102*b*. The printer driver 205 is a printer driver unique to a model of the printing apparatus 102*c*. The printer drivers 203 to 205 are each installed in the host computer 101, for example, when the associated printing apparatus is connected to the host computer 101.

The drivers, such as the print data generation software 202 and the printer drivers 203 to 205, convert the intermediate data acquired from the OS 201 to print data which can be interpreted by the associated printing apparatus and transmit the print data to the associated printing apparatus. Note that the print data includes drawing data as information on a picture (image) to be formed on a sheet surface and print setting attribute information (attribute information designating print settings) generated based on the print setting information set by the user. The print setting attribute information includes the attribute information indicating the functions which can be designated in the printing apparatus (capabilities of the printing apparatus) and settings associated with the attribute information.

The printing apparatuses, such as the printing apparatuses 102*a* to 102*d*, perform printing on a sheet surface based on the received print data. At the time, these printing apparatuses each form the drawing data included in the print data, by performing an operation according to the print setting attribute information included in the print data. The print setting attribute information includes the print quality setting (such as image quality priority and speed priority), the attribute information designating e.g. double-sided printing, and settings of the attribute information. For example, in a case where the attribute information designating double-sided printing and settings indicating the operation of double-sided printing are included in the print setting attribute information, the printing apparatus executes double-sided printing.

The extension application 206 is software for extending or supporting the function of the print data generation software 202 and is not embedded in the OS 201. Therefore, the user is required to install the extension application 206 downloaded from a server (not shown) via the Internet by operating the host computer 101. Note that when a printing apparatus is connected to the host computer 101, the extension application 206 associated with this printing apparatus can be automatically installed in the host computer 101 based on this connection. Specifically, in a case where a printing apparatus is connected to the host computer 101, the OS 201 acquires device identification information from the printing apparatus and downloads the extension application 206 associated with the acquired device identification information from the server via the Internet. That is, the print data generation software 202 and the extension application 206 are held in the host computer 101 as the separate files. Note that in a case where the extension application 206 is installed in the host computer 101, the OS 201 associates the extension application 206 with the connected printing apparatus and the print data generation software 202.

The extension application 206 includes a print setting screen extension module 207, a print function extension module 208, and a print data edit module 209. Further, the extension application 206 holds sharing information 210 which can be accessed from each unit. The actual state of the sharing information 210 is a file stored in the external storage device 114 or information stored in the RAM 113. The extension application 206 writes and reads information into and from the sharing information 210 by using an application program interface (API) provided by the OS 201. Note that the configuration of the extension application 206 is not limited to the above-described configuration but the extension application 206 can be configured to include only part of the above-mentioned modules or include a module other than the above-mentioned modules. Further, the extension application 206 is sometimes simply referred to as the print software.

The print setting screen extension module 207 performs support e.g. for making the appearance of the print setting screen more comprehensible and displaying items which cannot be displayed on a standard print setting screen. The print function extension module 208 edits the PDC generated by the print data generation software 202 or the OS 201. This makes it possible to add a print function which is not supported by the print data generation software 202 but can be extended by the extension application 206 and add an exclusive relation between settings of the print functions and the like. Note that in the present embodiment, the OS 201 starts the print function extension module 208 when the extension application 206 is associated with a printing apparatus and the print data generation software 202 for the first time. Further, the OS 201 can start the print function extension module 208 at another timing, such as a timing at which the OS 201 is started. By doing this, for example, in a case where an optional apparatus (such as a finisher) is added to the printing apparatus later, and a function related to printing is extended, the print function extension module 208 can detect the extended function and add this function to the PDC.

The print data edit module 209 receives print data from the print data generation software 202 and can edit the print data as desired. The edited print data is transmitted to the printing apparatus 102, and is printed on a sheet surface by the printing apparatus 102.

Next, the print setting screen displayed by the print application 200 will be described.

Figure 3A:
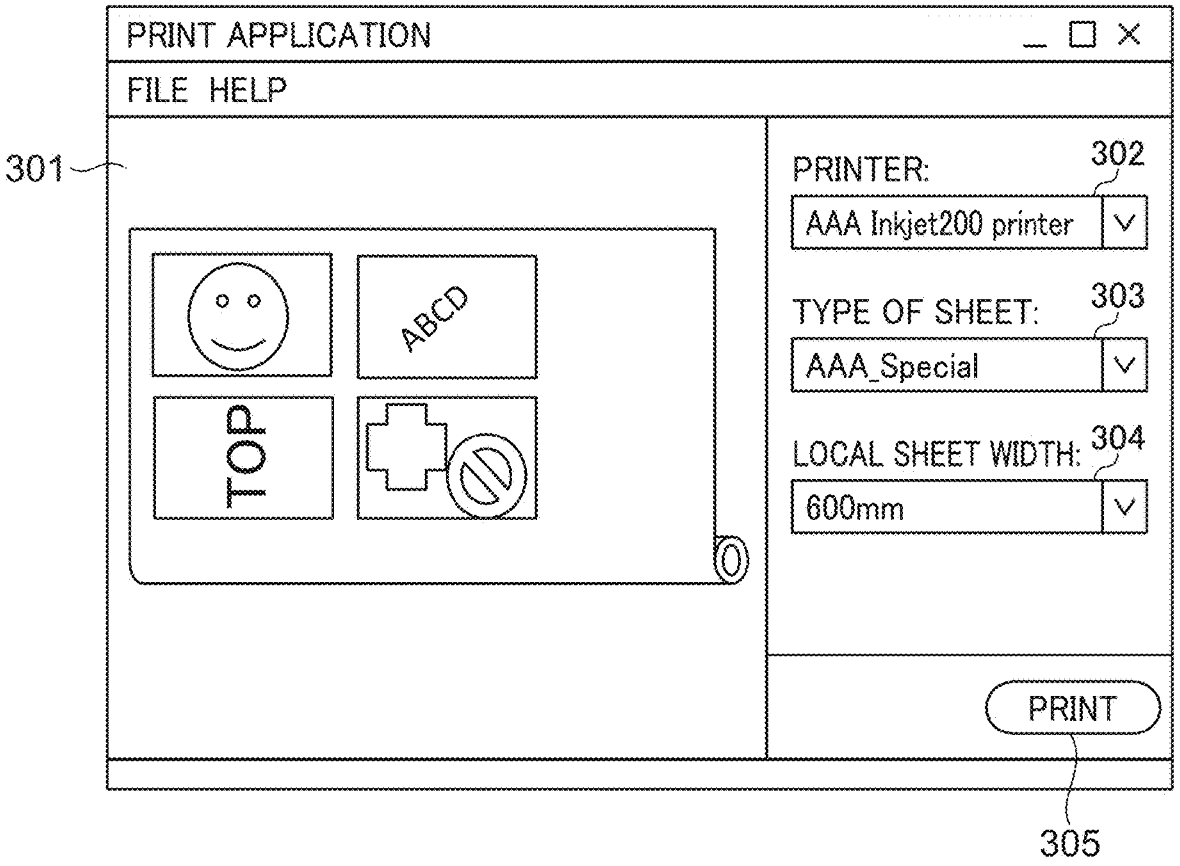
FIGS. 3A to 3C are diagrams each showing an example of a print setting screen displayed by a print application appearing in FIG. 2.

FIG. 3A is a diagram showing an example of the print setting screen displayed by the print application 200 appearing in FIG. 2. The user can display an image on the print setting screen and edit the displayed image. Note that as the method of displaying an image, for example, a method in which the user opens the explorer from a file menu of the print application 200 to display an image, or a method of displaying an image by directly dragging and dropping the image to the print application 200 can be used. Note that as the format of the image, an image format which can be interpreted by the print application 200, such as the Bitmap or Tiff image format, is used. Further, a vector format, such as the XPS and the Enhanced Metafile (EMF), can also be used.

As shown in FIG. 3A, the print setting screen includes a preview area 301, a printer setting 302, a sheet type setting 303, a roll sheet width setting 304, and a print button 305.

The preview area 301 is an area for displaying a preview image when an edited image is printed. In FIG. 3A, four images are displayed on the roll sheet surface, by way of example. Note that the user can directly adjust the size, the position, and so forth of the images by using e.g. the pointing device 117 while checking the preview image.

Figure 3B:
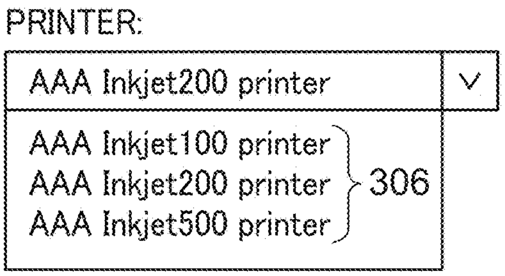

The printer setting 302 is a combo box for receiving designation of a print queue associated with the printer driver to be used for printing. Note that as described above, the print application 200 uses, out of the printer drivers installed in the host computer 101, only a print queue associated with a specific printer driver provided by a specific vendor as a print target. Therefore, only the print queue of the specific printer driver is displayed in the printer setting 302. In the present embodiment, as shown in FIG. 3B, only the print queues of the printer drivers of the model of the "AAA Inkjet" series, provided from the specific vendor, are displayed in the printer setting 302 as the print targets, by way of example. That is, even when a printer driver (such as a BBB Printer) provided from a vendor different from the specific vendor or a printer driver (such as an AAA Laser Printer) of a model of another series provided from the specific vendor has been installed in the host computer 101, print queues of these printer drivers are not displayed in the printer setting 302. By limiting the print targets to the print queues of the specific printer drivers, the print application 200 is not required to guarantee printing of a print queue of a printer driver which is not supported. Further, by narrowing the supporting targets, it is also possible to flexibly respond to a print function which is not standard (such as fine adjustment of an extension amount of frameless printing), which makes it possible to fully exhibit the specifications of the printing apparatus to be supported. A method of determining whether or not the printing apparatus is a printing apparatus to be supported includes, for example, a determination method based e.g. on the settings of Device Capabilities and Print Capabilities, and a printer model name. Further, the determination can also be performed based on whether or not a print queue of a printer driver can be controlled by a specific Software Development Kit (SDK).

The sheet type setting 303 is a combo box for receiving designation of a sheet type used for printing. The roll sheet width setting 304 is a combo box for receiving designation of a width of roll sheet used for printing. The print application 200 can acquire the capabilities information which can be set in the sheet type setting 303 and the roll sheet width setting 304, with respect to the print queue selected in the printer setting 302, by using the function of the OS 201, such as the PC. The print button 305 is a button for transmitting the print setting information set in the sheet type setting 303 and the roll sheet width setting 304 and layout information (drawing information) edited by the user in the preview area 301 to the printer driver associated with the print queue designated in the printer setting 302.

Here, an operation performed in a case where a printing apparatus of the model of the "AAA Inkjet" series supported by the print application 200 is connected to the host computer 101, and the print data generation software 202 is associated with this printing apparatus will be described. Conventionally, the print data generation software 202 does not support a specific SDK and can transmit Device Capabilities and the PC, by using only the standard values as a response. Further, the printer model name becomes a standard driver name, such as "IPP Class Driver" e.g. in Windows 11 (registered trademark). Therefore, in the standard mechanism, even if a printing apparatus to be supported is associated with the print data generation software 202, it is difficult for the print application 200 to determine whether or not to cause a print queue of the print data generation software 202 to be included in the print targets. Further, there is a high possibility that the print data generation software 202 whose function is not extended by the extension application 206 has only the standard print functions, and there can be a case where it is impossible to sufficiently satisfy the functions provided by the print application 200. For these reasons, conventionally, even when the printing apparatus of the model of the "AAA Inkjet" series is associated with the print data generation software 202, the print application 200 cannot cause a print queue of the print data generation software 202 to be included in the print targets. Therefore, even if a printing apparatus supported by the print application 200 is associated with the print data generation software 202, the user cannot designate a print queue of the print data generation software 202 as the print queue to be used for printing.

The following description will be given of a preferred embodiment for causing the print application 200 using only print queues of a specific printer driver provided from a specific vendor as print targets to use print queues of the print data generation software 202 as print targets.

Figure 4:
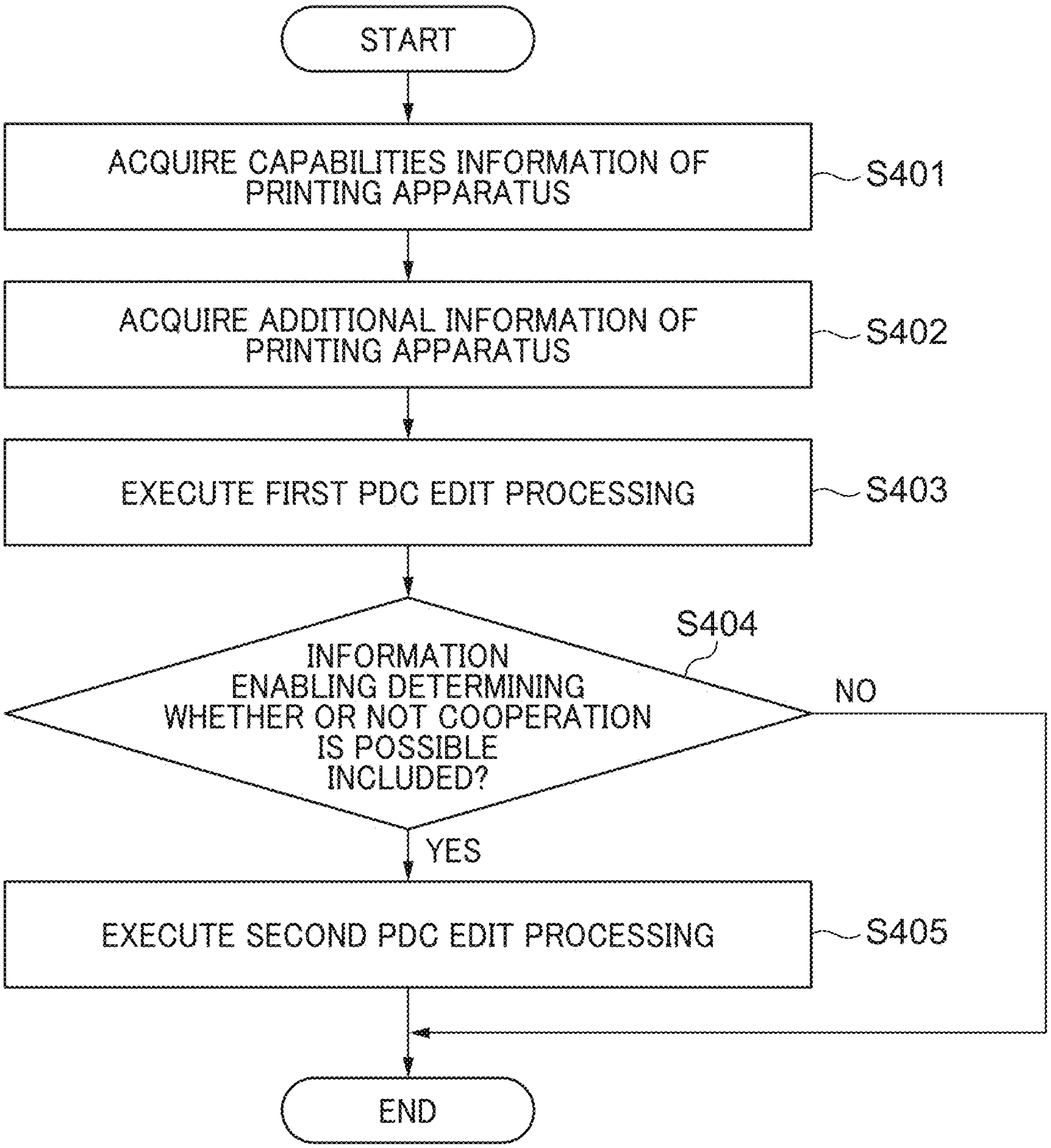
FIG. 4 is a flowchart of a PDC edit control process performed by a print function extension module appearing in FIG. 2.

FIG. 4 is a flowchart of a PDC edit control process performed by the print function extension module 208 appearing in FIG. 2. The print function extension module 208 is started by the OS 201 at a desired timing, such as a timing when a printer connected to the host computer 101 is associated with the print function extension module 208, a timing when the OS 201 is started, and a timing when the print setting screen extension module 207 is started, and executes the PDC edit control process. Note that in the present embodiment, it is assumed that the printing apparatus 102*d* of the printing apparatuses 102*a* to 102*d* connected to the host computer 101, whose associated printer driver unique to the model is not installed in the host computer 101, is associated with the print data generation software 202 and the extension application 206.

Referring to FIG. 4, first, in a step S401, the print function extension module 208 acquires the capabilities information of the printing apparatus 102*d* associated with the extension application 206. The capabilities information can be acquired by issuing a Get-Printers-Attributes operation of IPP to the printing apparatus 102*d*. Alternatively, the extension application 206 can acquire the capabilities information from the printing apparatus 102*d* by using another protocol.

Then, in a step S402, the print function extension module 208 acquires additional information concerning the printing apparatus 102*d* from an external apparatus, such as a Web server (not shown), as required. For example, the print function extension module 208 acquires the additional information concerning the printing apparatus 102*d* by issuing a Hypertext Transfer Protocol (HTTP) request to the Web server managed by the vendor which provides the printing apparatus 102*d* via the network interface 120. Note that the format of the additional information can be either the JSON format or the XML format. In the present embodiment, the additional information is information concerning a print application supporting the printing apparatus 102*d*. For example, as shown in FIG. 5A, information including information indicating that a print application A (version of 1.0 or higher), a print application B (version of 3.0 or higher), and a maintenance application C (version of 1.0 or higher) support the printing apparatus 102*d* is acquired. With such information, the print function extension module 208 can determine which of the print applications can cooperate with the printing apparatus 102*d* associated with the extension application 206. Further, the additional information can be e.g. category information of the print application supporting the printing apparatus 102*d*, as shown in FIG. 5B. FIG. 5B shows that a print application corresponding to a category "IJ_Soft01" supports the printing apparatus 102*d*.

Note that these additional information items can be held by the extension application 206 in advance or can be acquired in the step S401 as the capabilities information of the printing apparatus 102*d*. In a case where the additional information is acquired in the step S401 as the capabilities information of the printing apparatus 102*d*, the print function extension module 208 skips the step S402 and proceeds to a step S403. Further, the print function extension module 208 can always acquire the latest information from the above-described Web server or can acquire the information from the Web server only in a case where a specific device ID or specific information is acquired from the printing apparatus 102*d*. Further, in a case where it is possible to determine whether or not the print application 200 supports the printing apparatus 102*d* based only on the standard capabilities information acquired in the step S401, the print function extension module 208 can skip the step S402. For example, in a case where it is possible to determine whether or not the print application 200 supports the printing apparatus 102*d* based only on a value of marker-type received from the printing apparatus 102*d* as a response to the Get-Printer-Attributes operation, the step S402 is skipped.

Then, in the step S403, the print function extension module 208 executes first PDC edit processing based on the acquired capabilities information of the printing apparatus 102*d* and the information held by the print function extension module 208 itself. In the first PDC edit processing, for example, addition of a print function unique to the vendor, which is not supported by the print data generation software 202, addition of the exclusive relation between settings of print functions, which is not described in the PDC, and so forth are performed. FIG. 6 shows PDC 601 before being edited in the step S403, and FIG. 7 shows PDC 701 after being edited in the step S403. In the PDC 601 before being edited in the step S403, only the standard print setting information supported by the print data generation software 202 is included. The print function extension module 208 edits the PDC 601 based on the acquired capabilities information of the printing apparatus 102*d* and the information held by the print function extension module 208 itself. For example, information 703 of a sheet type uniquely defined by the vendor: AAA_Special, information 704 concerning the roll sheet width, a name space 702, and so forth are added.

Then, in a step S404, the print function extension module 208 determines whether or not information which enables determination on the possibility of cooperation between the print application 200 and the printing apparatus 102*d* is included in the information acquired in the step S401 or S402 and the information held by the print function extension module 208 itself. Note that the information which enables determination on the possibility of cooperation between the print application 200 and the printing apparatus 102*d* is, for example, the information shown in FIG. 5A and the information shown in FIG. 5B.

If it is determined in the step S404 that the information which enables determination on the possibility of cooperation between the print application 200 and the printing apparatus 102*d* is not included, the PDC edit control process is terminated. If it is determined in the step S404 that the information which enables determination on the possibility of cooperation between the print application 200 and the printing apparatus 102*d* is included, the PDC edit control process proceeds to a step S405.

In the step S405, the print function extension module 208 executes second PDC edit processing, followed by terminating the PDC edit control process.

By executing the second PDC edit processing, PDC 801 shown in FIG. 8 is obtained. In the PDC 801, determination information 802 which is not included in the PDC 701 is added. The determination information 802 is information for determining whether or not the print application 200 can cause a print queue of the print data generation software 202 to be included in the print targets. The determination information 802 includes e.g. information concerning a print application supporting the printing apparatus 102*d* associated with the print data generation software 202. For example, the determination information 802 includes information indicating that a print application corresponding to "IJ-Soft01" can support the printing apparatus 102*d* associated with the print data generation software 202 based on the information shown in FIG. 5B.

As a specific example, there is a case where the extension application 206 supports both of a laser printer and an inkjet printer, provided by the vendor, and the print applications cooperating with the respective printing apparatuses are different. In this case, the print application cooperating with the inkjet printer is enabled to cause a print queue of the print data generation software 202 associated with the inkjet printer to be included in the print targets based on the information of "IJ_Soft01". Further, the print application cooperating with the laser printer is enabled to cause a print queue of the print data generation software 202 associated with the inkjet printer to be excluded from the print targets based on the information of "IJ_Soft01".

Note that, by using a value of marker-types, received in response to the Get-Printer-Attributes operation, without using the information shown in FIG. 5B as the category information of the printing apparatus, the determination can be performed based on whether or not this value is ink-cartridge. Further, as described above, the detailed information of the cooperating print application 200 can be added to the determination information 802 as in the information shown in FIG. 5A. Alternatively, in a case where it is unnecessary to add unique information for the cooperating print application 200, the step S405 can be skipped. For example, if it is possible to determine, based only on the information 702 to 704 added in the step S403, whether or not the printing apparatus 102*d* is a printer supported by the print application 200, it is unnecessary to add the unique information. For example, the print application 200 can determine, based on the description of the name space 702 which is unique to a specific vendor, that the extension application 206 is associated with the print data generation software 202. Further, in a case where the configuration is such that the description in the name space 702 which is unique to a specific vendor is changed according to the category information of the printing apparatus 102*d*, the category information of the printing apparatus 102*d* can also be determined from the name space 702. In this case, if the print application determines, based on the category information of the printing apparatus 102*d*, whether or not the printing apparatus 102*d* is a printer to be supported, it is possible to determine, based on the description in the name space 702, whether or not the printing apparatus 102*d* is a printer to be supported.

Note that there is a case where extension of the print data generation software 202 is an essential condition to cooperate with the print application 200. For example, in a case where the print application 200 is an application requiring the roll sheet width information, and at the same time, the information 704 concerning the roll sheet width has been added in the step S403, the print data generation software 202 is enabled to cooperate with the print application 200. Inversely, in a state in which the roll sheet width information has not been added to the PDC, the print function extension module 208 does not execute the step S405 or processes the PDC to describe that the print data generation software 202 is incapable of cooperate with the print application 200. With this configuration, it is possible to prevent the print data generation software 202 from cooperating with the print application 200 in a state in which the function of the print data generation software 202 is insufficient.

Note that in a case where the print application 200 does not require extension of the print data generation software 202 and uses only the standard print settings, installation of the extension application 206 and the process in FIG. 4 are not essential. In this case, the print application 200 is required to determine whether or not a printing apparatus supported by the print application 200 itself in the standard mechanism is associated with the print data generation software 202. As the determination method, for example, the print application 200 acquires manufacture information of a printer using the API, such as Enum Printer Data, and can determine, based on an acquired value, whether or not the printer is a printer of the vendor in question. Further, the print application 200 can also narrow a condition, such as a condition that the printing apparatus is supported only in a case where the printing apparatus is compatible with frameless printing, based on the information of the Print Capabilities.

Figure 9:
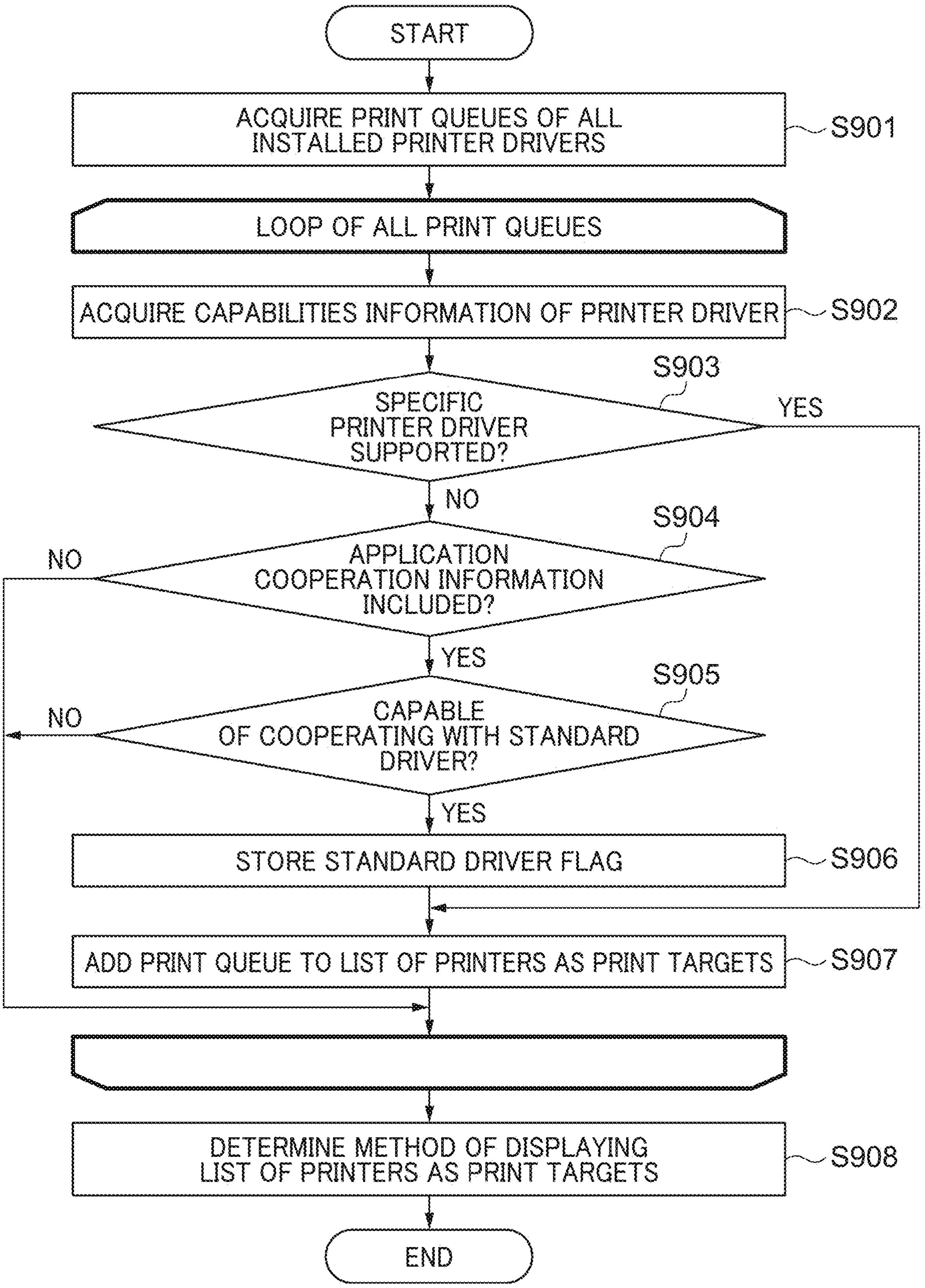
FIG. 9 is a flowchart of a print queue acquisition control process performed by the print application appearing in FIG. 2.

FIG. 9 is a flowchart of a print queue acquisition control process performed by the print application 200 appearing in FIG. 2. The print queue acquisition control process is executed at a predetermined timing at which it is necessary to display options of the printer driver in the printer setting 302, such as a timing when the print application 200 is started.

Referring to FIG. 9, first, the print application 200 acquires a list of print queues of all printer drivers installed in the host computer 101 via the API, such as Get Print Queues (step S901). The print application 200 specifies one print queue from the plurality of print queues acquired in the step S901 and executes steps S902 to S907 with respect to the specified queue. When the processing in the step S907 is completed with respect to this print queue, the print application 200 specifies the next print queue from the plurality of print queues acquired in the step S901 and executes the steps S902 to S907 with respect to the specified queue. Thus, the print application 200 repeatedly executes the steps S902 to S907 the number of times corresponding to the number of print queues acquired in the step S901. When the processing operations in the steps S902 to S907 are completed with respect to all of the print queues, the process proceeds to a step S908.

In the step S902, the print application 200 acquires the capabilities information of a printer driver associated with the specified print queue by using the API, such as the PC.

Then, in the step S903, the print application 200 determines whether or not the printer driver associated with the specified print queue is a specific printer driver supported by the print application 200. As the determination method used in the step S903, as described concerning the item of the printer setting 302, various methods can be used. For example, in a case where the value of DC_PERSONALITY of Device Capabilities is a specific value, such as "XYZ", or in a case where a tag of "ABC" is included in the PC, it is determined that the printer driver is a specific printer driver supported by the print application 200. Further, in a case where the printer driver can be operated by using an SDK which supports the target printer driver, or in a case where a prefix of the printer model name is "AAA Inkjet", it is also determined that printer driver is a specific printer driver supported by the print application 200.

If it is determined in the step S903 that the printer driver associated with the specified print queue is a specific printer driver supported by the print application 200, the print queue acquisition control process proceeds to the step S907, described hereinafter. If it is determined in the step S903 that the printer driver associated with the specified print queue is not a specific printer driver supported by the print application 200, the print queue acquisition control process proceeds to a step S904.

In the step S904, the print application 200 determines whether or not application cooperation information for determining whether or not a print queue of the print data generation software 202 can be caused to be included in the print targets is included in the information of PC and the like acquired in the step S902.

FIG. 10 is a diagram showing an example of PC 1001 generated by the OS 201 based on the PDC 801 shown in FIG. 8. As described above, the PDC 801 includes the determination information 802 for determining whether or not the print application 200 can cause a print queue of the print data generation software 202 to be included in the print targets. The PC 1001 includes information 1002 (application cooperation information) including a "Support App" tag based on the determination information 802. In the step S904, for example, in a case where the "Support App" tag is not included in the acquired information such as the PC, it is determined that the application cooperation information is not included in the information such as the PC, acquired in the step S902. In this case, the print queue acquisition control process shifts to the next loop processing (processing with respect to the next print queue). On the other hand, in a case where the "Support App" tag, appearing in FIG. 10, is included in the acquired information such as the PC, it is determined that the application cooperation information is included in the information such as the PC, acquired in the step S902. In this case, the print queue acquisition control process proceeds to a step S905.

In the step S905, the print application 200 determines whether or not the print application 200 can cooperate with the print data generation software 202 (standard driver) based on the acquired information such as the PC. For example, in a case where the information 1002 is included in the acquired PC and the print application 200 is not a print application corresponding to "IJ_Soft01", it is determined that the print application 200 does not support the printing apparatus 102*d* associated with the print data generation software 202. In this case, it is determined that the print application 200 cannot cooperate with the print data generation software 202, and the print queue acquisition control process shifts to the next loop processing. On the other hand, in a case where the information 1002 is included in the acquired PC and the print application 200 is a print application corresponding to "IJ_Soft01", it is determined that the print application 200 supports the printing apparatus 102*d* associated with the print data generation software 202. In this case, it is determined that the print application 200 can cooperate with the print data generation software 202, and the print queue acquisition control process proceeds to a step S906.

Note that in the present embodiment, as described above, if it is possible to determine whether or not the printing apparatus 102*d* is a printing apparatus supported by the print application 200, based only on the information 702 to 704 added in the step S403, the determination information 802 is not added to the PDC. The application cooperation information is not included in the PC generated based on the PDC. In a configuration using the PC which does not include the application cooperation information as described above, if it is determined in the step S903 that the printer driver associated with the specified print queue is not a specific printer driver, the step S904 can be skipped and the step S905 can be executed. In this determination in the step S905, in a case where predetermined information is included in the acquired PC, it is determined that the print application 200 supports the printing apparatus 102*d* associated with the print data generation software 202. The predetermined information is e.g. the manufacture information indicating that the vendor name is "vendor AAA" and the information indicating a specific print function, such as frameless printing. Further, the predetermined information is a name space which is unique to a specific vendor and enables determination of the category information of the printing apparatus 102*d*.

In the step S906, the print application 200 stores a standard driver flag in the RAM 113. The standard driver flag is a flag indicating that the printer driver associated with the specified print queue is the print data generation software 202.

Then, in the step S907, the print application 200 adds the specified print queue to the list of printers as print targets which are displayed as the options in the printer setting 302. After that, the print queue acquisition control process shifts to the next loop processing. When the processing operations in the steps S902 to S907 are completed with respect to all of the print queues, the process proceeds to the step S908.

In the step S908, the print application 200 determines a method of displaying the list of printers as print targets based on the standard driver flag stored in the RAM 113 in the step S906. After that, the print queue acquisition control process is terminated.

Figure 3C:
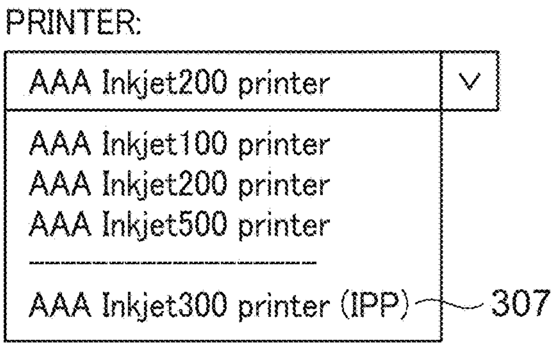

FIG. 3B shows an example of the display of the printer setting 302 in a conventional information processing apparatus, whereas FIG. 3C shows an example of the display of the printer setting 302 in the host computer 101 of the present embodiment. Reference numeral 306 in FIG. 3B indicates display of only the print queues of the printer drivers 203 to 205 of the "AAA Inkjet" series. That is, a print queue of the print data generation software 202 associated with the printing apparatus 102*d* of the model of the "AAA Inkjet" series is not displayed. On the other hand, in FIG. 3C, not only the print queues of the printer drivers 203 to 205 of the model of the "AAA Inkjet" series, but also the print queue of the print data generation software 202 associated with the printing apparatus 102*d* of the model of the "AAA Inkjet" series is displayed, as indicated by reference numeral 307.

According to the above-described embodiment, in a case where it is determined, based on the PC generated based on the PDC which does not include the determination information, that the print application 200 supports the printing apparatus 102*d* associated with the print data generation software 202, a print queue of the print data generation software 202 is added to the list of printers as print targets. With this, it is possible to cause the user to designate the print queue of the print data generation software 202 associated with the printing apparatus 102*d* supported by the print application 200.

Further, in the above-described embodiment, the PC includes the information indicating the name of the vendor which provides the printing apparatus 102*d* associated with the print data generation software 202 and the specific print function. With this, it is possible to determine whether or not the print application 200 supports the printing apparatus 102*d* associated with the print data generation software 202, by using the information indicating the name of the vendor and the specific print function, which is included in the PC.

Further, in the above-described embodiment, the PC includes the name space which is a name space unique to a specific vendor and enables determination of the category information of the printing apparatus 102*d* associated with the print data generation software 202. This makes it possible to determine, by using the name space included in the PC, whether or not the print application 200 supports the printing apparatus 102*d* associated with the print data generation software 202.

Further, in the above-described embodiment, in a case where it is determined, based on the PC 1001 generated based on the PDC 801 including the determination information 802, that the print application 200 supports the printing apparatus 102*d* associated with the print data generation software 202, the print queue of the print data generation software 202 is added to the list of printers as print targets. With this, it is possible to prompt the user to designate the print queue of the print data generation software 202 associated with the printing apparatus 102*d* supported by the print application 200.

Further, in the above-described embodiment, the determination information 802 includes the information concerning the print application supporting the printing apparatus 102*d* associated with the print data generation software 202. This makes it possible to accurately determine whether or not the print application 200 supports the printing apparatus 102*d* associated with the print data generation software 202.

Note that in the present embodiment, it is possible to improve the display of the list of printers by using the flag information stored in the RAM 113 in the step S906. For example, the print application 200 displays the list in a state in which sections and categories are divided. Further, as shown in FIG. 3C, the printer application 200 displays a print queue of the standard driver at the end of the list. This enables a user to easily select a printer driver unique to a model, whose functions are enhanced. Further, there are methods, in which the print application 200 displays a print queue of the standard driver by adding information indicating this fact, such as "(IPP)", or the print application 200 displays a print queue of the standard driver by changing an icon of the printer. With this control, the user is enabled to grasp a difference in type of the printer driver on the display screen shown in FIG. 3C.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-135338 filed Aug. 23, 2023, which is hereby incorporated by reference herein in its entirety.

What is claimed is:

1. An information processing apparatus comprising:

an operating system in which print data generation software is embedded in advance;

a print application configured to use, as a printing destination, a printing apparatus associated with a print queue of a specific printer driver supplied from a specific vendor;

at least one processor; and a memory coupled to the at least one processor storing instructions that, when executed by the processor, cause the processor to function as:

an acquisition unit configured to acquire capabilities information of a printing apparatus associated with the print data generation software;

a determination unit configured to determine whether or not the print application supports a printing apparatus associated with the print data generation software, based on the capabilities information; and an addition unit configured to add a print queue of the specific printer driver to a list of print queues for prompting a user to select a print queue to be used for printing, wherein in a case where it is determined that the print application supports the printing apparatus associated with the print data generation software, the addition unit adds a print queue of the print data generation software to the list.

2. The information processing apparatus according to claim 1, wherein the capabilities information includes information indicating a name of a vendor that provides a printing apparatus associated with the print data generation software and a specific print function.

3. The information processing apparatus according to claim 1, wherein the capabilities information includes a name space which is unique to the specific vendor and enables determination of category information of the printing apparatus associated with the print data generation software.

4. The information processing apparatus according to claim 1, further comprising a display unit configured to display, based on the list, both of a print queue of the print data generation software and a print queue of the specific printer driver.

5. An information processing apparatus comprising:

an operating system in which print data generation software is embedded in advance;

an application configured to support a function of the print data generation software;

a print application configured to use, as a printing destination, a printing apparatus associated with a print queue of a specific printer driver supplied from a specific vendor;

at least one processor; and a memory coupled to the at least one processor storing instructions that, when executed by the processor, cause the processor to function as:

a determination information addition unit configured to add determination information for determining whether or not a print queue of the print data generation software can be caused to be included in print targets, to print function information generated by the print data generation software or the operating system;

a determination unit configured to determine whether or not the print application supports a printing apparatus associated with the print data generation software, based on capabilities information generated based on the print function information including the determination information; and a print queue addition unit configured to add a print queue of the specific printer driver to a list of print queues for prompting a user to select a print queue to be used for printing, wherein in a case where it is determined that the print application supports the printing apparatus associated with the print data generation software, the print queue addition unit adds a print queue of the print data generation software to the list.

6. The information processing apparatus according to claim 5, wherein the determination information includes information concerning a print application that supports a printing apparatus associated with the print data generation software.

7. The information processing apparatus according to claim 5, further comprising a display unit configured to display, based on the list, both of a print queue of the print data generation software and a print queue of the specific printer driver.

8. The information processing apparatus according to claim 7, wherein the print queue of the print data generation software is displayed in a state distinguishable from the print queue of the specific printer driver.

9. A method of controlling an information processing apparatus including an operating system in which print data generation software is embedded in advance, and a print application configured to use, as a printing destination, a printing apparatus associated with a print queue of a specific printer driver supplied from a specific vendor, the method comprising:

acquiring capabilities information of a printing apparatus associated with the print data generation software;

determining whether or not the print application supports a printing apparatus associated with the print data generation software, based on the capabilities information; and adding a print queue of the specific printer driver to a list of print queues for prompting a user to select a print queue to be used for printing, wherein in a case where it is determined that the print application supports the printing apparatus associated with the print data generation software, said adding includes adding a print queue of the print data generation software to the list.

10. A method of controlling an information processing apparatus including an operating system in which print data generation software is embedded in advance, an application configured to support a function of the print data generation software, and a print application configured to use, as a printing destination, a printing apparatus associated with a print queue of a specific printer driver supplied from a specific vendor, the method comprising:

adding determination information for determining whether or not a print queue of the print data generation software can be caused to be included in print targets, to a print function information generated by the print data generation software or the operating system;

determining whether or not the print application supports a printing apparatus associated with the print data generation software, based on capabilities information generated based on the print function information including the determination information; and adding a print queue of the specific printer driver to a list of print queues for prompting a user to select a print queue to be used for printing, wherein in a case where it is determined that the print application supports the printing apparatus associated with the print data generation software, said adding includes adding a print queue of the print data generation software to the list.

11. A non-transitory computer-readable storage medium storing a program for causing a computer to execute a method of controlling an information processing apparatus including an operating system in which print data generation software is embedded in advance, and a print application configured to use, as a printing destination, a printing apparatus associated with a print queue of a specific printer driver supplied from a specific vendor, wherein the method comprises:

acquiring capabilities information of a printing apparatus associated with the print data generation software;

determining whether or not the print application supports a printing apparatus associated with the print data generation software, based on the capabilities information; and adding a print queue of the specific printer driver to a list of print queues for prompting a user to select a print queue to be used for printing, wherein in a case where it is determined that the print application supports the printing apparatus associated with the print data generation software, said adding includes adding a print queue of the print data generation software to the list.

12. A non-transitory computer-readable storage medium storing a program for causing a computer to execute a method of controlling an information processing apparatus including an operating system in which print data generation software is embedded in advance, an application configured to support a function of the print data generation software, and a print application configured to use, as a printing destination, a printing apparatus associated with a print queue of a specific printer driver supplied from a specific vendor, wherein the method comprises:

adding determination information for determining whether or not a print queue of the print data generation software can be caused to be included in print targets, to a print function information generated by the print data generation software or the operating system;

determining whether or not the print application supports a printing apparatus associated with the print data generation software, based on capabilities information generated based on the print function information including the determination information; and adding a print queue of the specific printer driver to a list of print queues for prompting a user to select a print queue to be used for printing, wherein in a case where it is determined that the print application supports the printing apparatus associated with the print data generation software, said adding includes adding a print queue of the print data generation software to the list.

* * * * *